United States Patent [19]

Hutter et al.

[11] Patent Number: 4,654,192
[45] Date of Patent: Mar. 31, 1987

[54] TEMPERATURE ACTUATED AUTOMATIC SAFETY ROD RELEASE

[75] Inventors: Ernest Hutter, Wilmette; John A. Pardini, Brookfield; David E. Walker, Naperville, all of Ill.

[73] Assignee: The United States of America as represented by the United States Department of Energy, Washington, D.C.

[21] Appl. No.: 589,254

[22] Filed: Mar. 13, 1984

[51] Int. Cl.⁴ .............................................. G21C 7/08
[52] U.S. Cl. .................................. 376/336; 285/187; 403/28; 403/32
[58] Field of Search ....................... 376/327, 336, 337; 403/28, 30, 32, 329; 285/1, 2, 187, 178, 905

[56] References Cited

U.S. PATENT DOCUMENTS 3,976,543 8/1976 Sowa .
4,405,558 9/1983 Mangus et al. .

OTHER PUBLICATIONS

ANL/CT-74-10, Apr. 1974, pp. 2, 3, 34, 35, 44, 48, 49.

Primary Examiner—Harvey E. Behrend
Attorney, Agent, or Firm—Sandra B. Weiss; Hugh W. Glenn; Judson R. Hightower

[57] ABSTRACT

A temperature-actuated apparatus is disclosed for releasably supporting a safety rod in a nuclear reactor, comprising a safety rod upper adapter having a retention means, a drive shaft which houses the upper adapter, and a bimetallic means supported within the drive shaft and having at least one ledge which engages a retention means of the safety rod upper adapter. A pre-determined increase in temperature causes the bimetallic means to deform so that the ledge disengages from the retention means, whereby the bimetallic means releases the safety rod into the core of the reactor.

6 Claims, 5 Drawing Figures

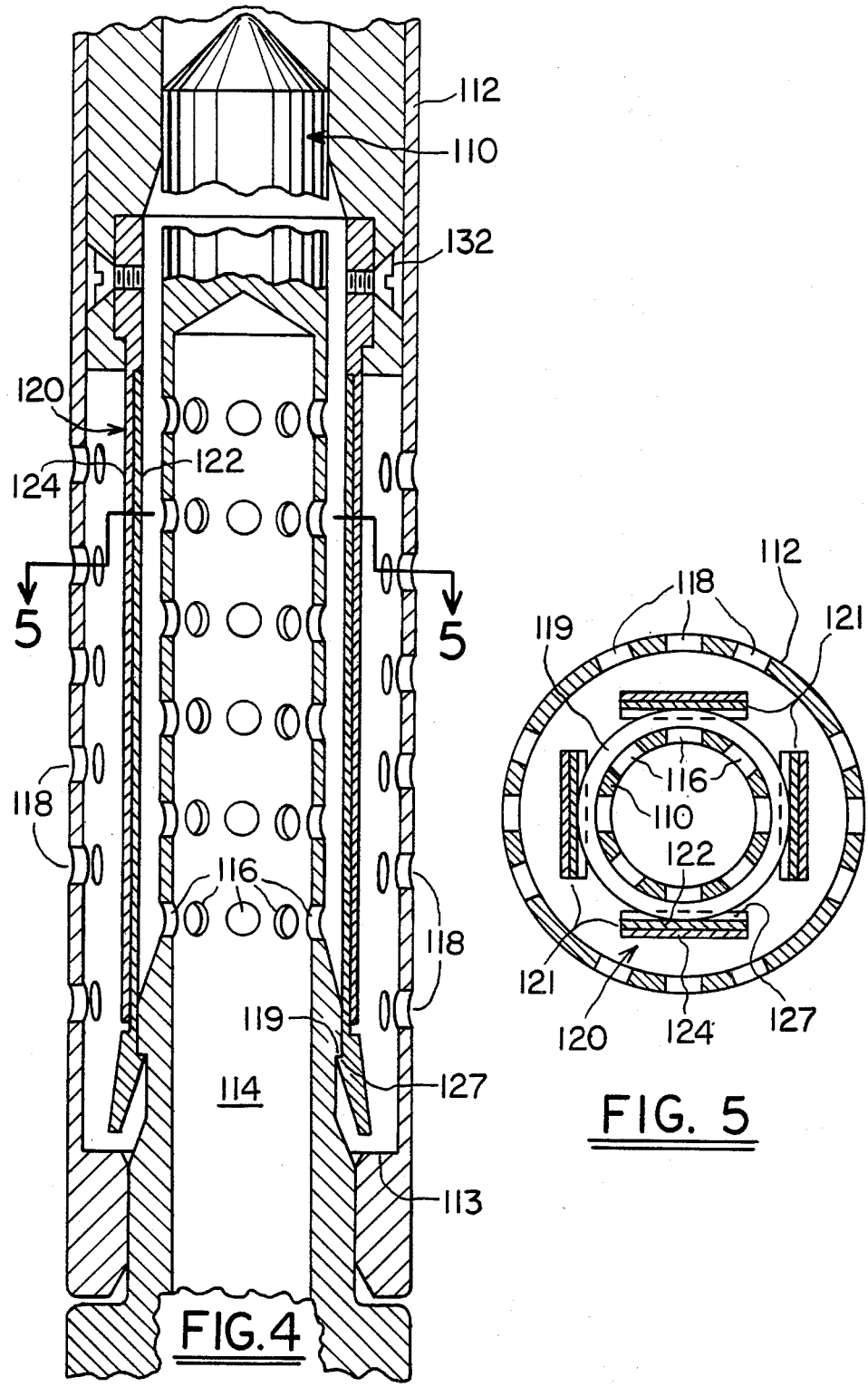

TEMPERATURE ACTUATED AUTOMATIC SAFETY ROD RELEASE

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to an apparatus for use with a safety rod in a nuclear reactor. More particularly, this invention relates to an apparatus for use with a safety rod in a nuclear reactor which in the event of a predetermined temperature increase will automatically release the safety rod into the core of the reactor.

A nuclear reactor typically includes a reactor vessel containing a core, said core comprising vertical elongated fuel assemblies interspersed with control and safety rods. In a liquid metal fast breeder reactor (LMFBR) the fuel assemblies are usually supported from beneath the core, while the control rods and safety rods are housed in drive shafts which are suspended from drive means disposed above the core. The drive means control the elevation of the rods with respect to the core. The fuel assemblies are disposed to provide a critical mass of nuclear fuel within the core so that a nuclear chain reaction is sustained and nuclear energy is produced. Coolant flows upwardly from the bottom of the reactor vessel, past the fuel assemblies and control rods, and out of the vessel, carrying energy produced by the chain reaction as heat to a heat exchange system.

The nuclear chain reaction is moderated by means of the control and safety rods. These rods may contain either a nuclear fuel, a neutron poison, or some combination of fuel and poison, depending on the design of the particular reactor. Regardless of composition, the rods are typically designed so that upward motion of the rods accelerates the chain reaction, and downward motion of the rods slows the chain reaction.

Under normal operating conditions, the control rods are used to adjust the reactor power level by incremental vertical movement. The safety rods are used to stop the chain reaction in the event of an abnormal occurrence which results in a substantial increase in temperature, such as a thermal excursion. Under normal operating conditions the safety rods are in a fully elevated position above the reactor core. In the event of a thermal excursion, the reactor can be rendered subcritical by lowering only a few safety rods into the reactor core.

For maximum safety, nuclear reactors are designed to anticipate and respond appropriately to breakdowns due to either equipment malfunctions or natural disasters which can result in thermal excursions. Under such emergency conditions, the primary automatic safety system of the reactor is designed to rapidly force the safety rods down into the reactor core at a rate of several feet per second. This rapid movement, known as a reactor "scram," immediately stops the nuclear chain reaction. Thus, if a thermal excursion should raise the coolant temperature a predetermined amount above its normal safe operating level, the primary automatic safety system is activated to lower the safety rods and scram the reactor. However, it would be desirable for the reactor to be safe even if the primary automatic safety system were to fail. In that case, it would be desirable to have a supplemental system which would release the safety rods downward into the core to stop the nuclear chain reaction. Preferably, such a system would operate independently of signal actuation. Ideally, such a system would operate on the basis of physical principles and would require no mechanical linkages.

Attempts have been made to design such systems. These designs are often activated by overheating of the flowing coolant or loss of coolant flow. For example, it is known to fasten safety rods to the saftey rod drive shafts by means of hydraulic couplings that lose their holding power with the decline of coolant flow. In another design, disclosed in U.S. Pat. No. 4,405,558 to Mangus et al., safety rods are fastened to safety rod drive shafts by magnets that lose their magnetic fields at certain temperatures. Still another design, set forth in U.S. Pat. No. 3,976,543 to Sowa, discloses a safety rod supported by convex bimetallic disks which invert at certain temperatures to release the safety rod. These systems have varying degrees of complexity which may affect their dependability, and also their ease of installation. A simpler, more reliable system would be desirable.

SUMMARY OF THE INVENTION

It is thus one object of the invention to provide an apparatus for use with a safety rod in a nuclear reactor that in the event of a pre-determined increase in temperature will automatically release the safety rod into the core of the reactor.

It is another object of the invention to provide such an apparatus that operates independently of signal actuation.

It is yet another object of the invention to provide such an apparatus that is simple and has no mechanical linkages.

Additional objects, advantages, and novel features of the invention will be set forth in part in the following description.

In accordance with the invention, an apparatus is provided which releasably supports a safety rod such that the apparatus automatically releases the rod into the core in the event of a pre-determined increase in temperature. The apparatus comprises an upper adapter affixed to the upper end of a safety rod, a drive shaft which houses the upper adapter such that the upper adapter extends upwardly into the drive shaft, whereby the safety rod is suspended above the reactor core, and a bimetallic means supported by said drive shaft which releasably engages said upper adapter. In the event of a pre-determined increase in temperature, the bimetallic means deforms so as to disengage from said upper adapter, thereby releasing said safety rod so that the rod drops into the reactor core.

The upper adapter is provided with a retention means such as a protruding shoulder around its circumference. In one embodiment of the invention the bimetallic means is a substantially cylindrical member which engages the protruding shoulder to support the upper adapter. The bimetallic substantially cylindrical member has an inner layer and an outer layer, the inner layer having a larger thermal coefficient of expansion than the outer layer. The bimetallic member is further provided with a split in substantially the axial direction. When the member is heated a pre-determined amount above the normal operating temperature of the reactor, the difference in the coefficients of expansion of the two layers causes the cylindrical member to deform by opening at the split whereby the cylindrical member disengages from the protruding shoulder of the upper adapter, thereby releasing the safety rod.

In another embodiment of the invention, the retention means of the upper adapter is again a protruding shoulder and the bimetallic means comprises a plurality of vertical strips suspended parallel to the upper adapter. The inner layer of each strip has a greater thermal coefficient of expansion than its corresponding outer layer. The inner layer of each strip has a supporting ledge which engages the protruding shoulder of the upper adapter to support the safety rod. When the strips are heated a pre-determined amount above the normal operating temperature of the reactor, the differences in the coefficients of expansion of the respective inner and outer layers cause the strips to deform by deflecting away from the adapter near the region of engagement so that the supporting ledges disengage from the protruding shoulder of the upper adapter, thereby releasing the safety rod.

It may be seen that the invention is inherently reliable because its operation is based on first principles, and because it does not rely on independent actuation. The device is simple and requires no mechanical linkages.

DESCRIPTION OF THE FIGURES

FIG. 4 illustrates an embodiment of the invention wherein the bimetallic means comprises a plurality of vertical strips.

FIG. 5 is a cross-sectional view along line 5.—5. of FIG. 4.

DETAILED DESCRIPTION OF THE INVENTION

The instant invention is an apparatus for releasably supporting a safety rod, said apparatus being actuated automatically by a pre-determined increase in temperature. The device includes a bimetallic component which comprises two intimately bonded metals having different thermal coefficients of expansion. An increase in the temperature of the component will cause a deflection toward the side of the component having the lower expansion coefficient. If one end of the component is held fast, the free end will deflect from its original configuration. When the temperature of the component returns to normal, the component will resume its original configuration.

Figure 1:
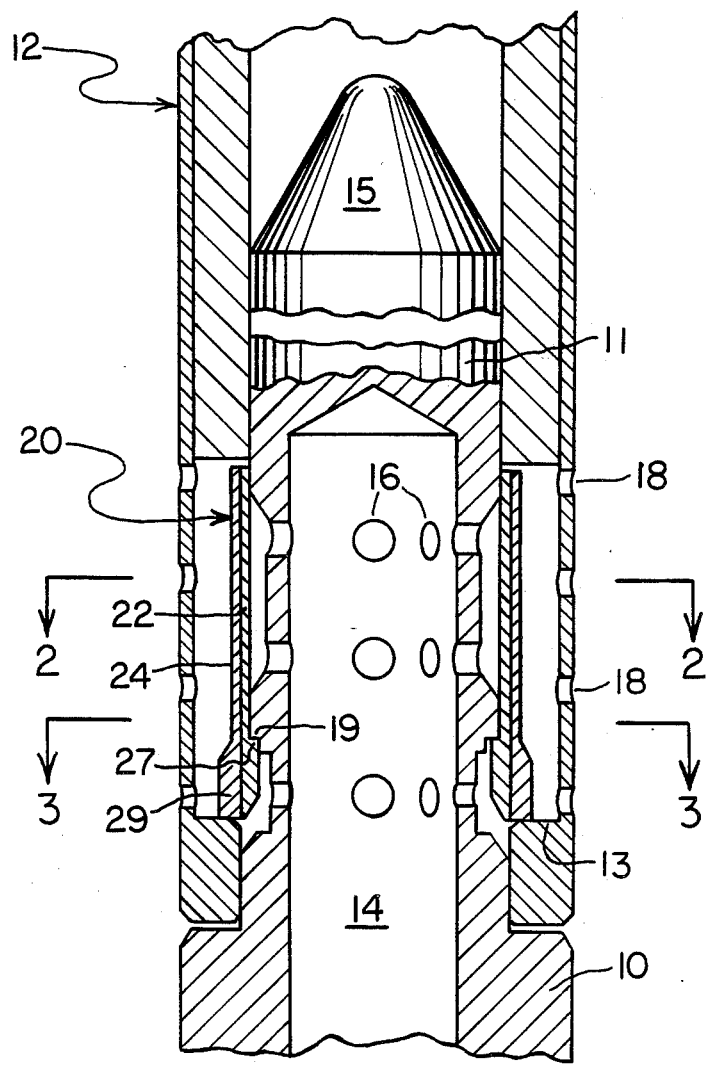
FIG. 1 is a cross-section of a safety rod upper adapter housed in a safety rod drive shaft, showing the embodiment of the invention wherein the bimetallic means is substantially cylindrical, the cross-section being taken along line 1.—1. of FIG. 2.
Figure 2:
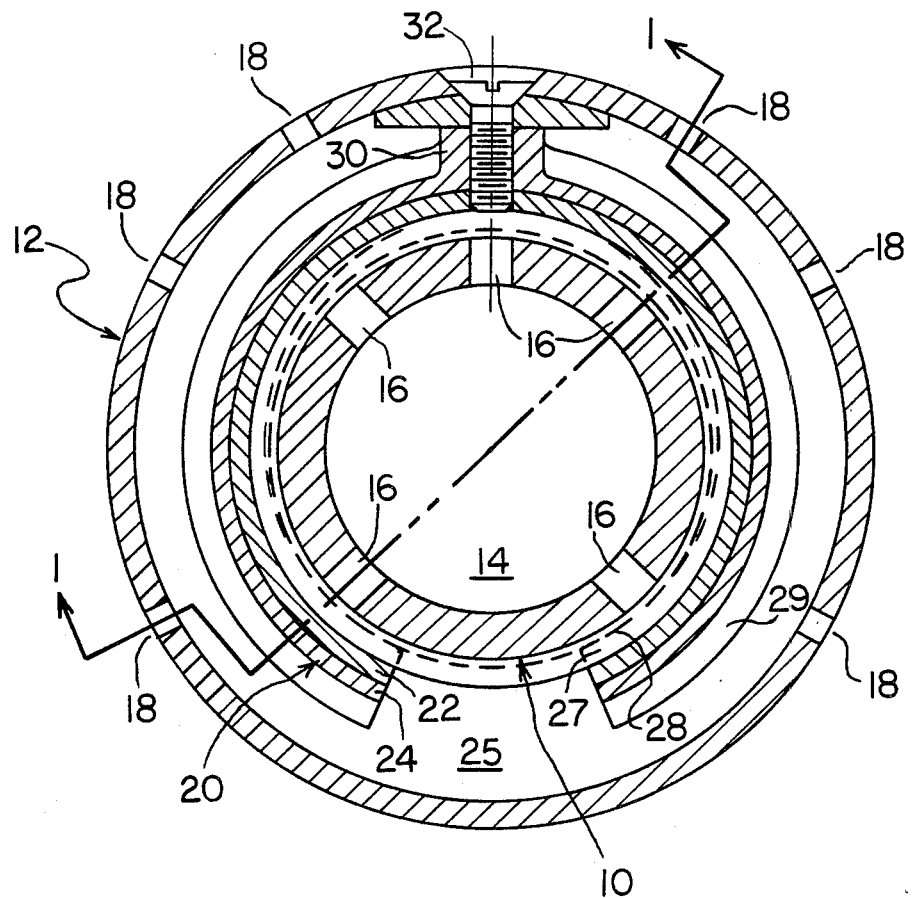
FIG. 2 is a cross-sectional view along line 2.—2. of FIG. 1.
Figure 3:
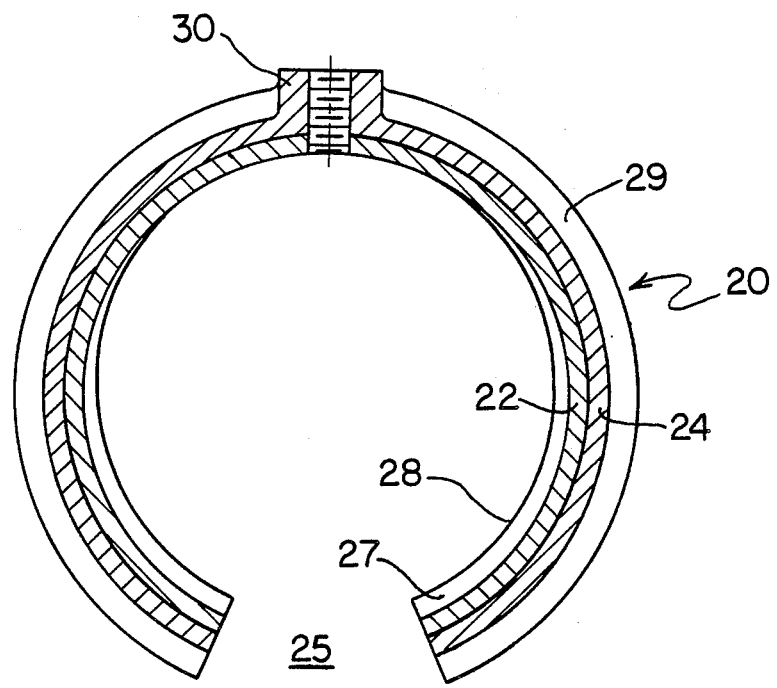
FIG. 3 is a cross-sectional view along line 3.—3. of FIG. 1, showing the substantially cylindrical member.

The instant invention is readily understood by reference to FIGS. 1-3 which show safety rod upper adapter 10 housed within safety rod drive shaft 12. Coolant flows upwardly from the safety rod (not shown) through the hollow interior 14 of upper adapter 10 and out into the reactor vessel through ports 16 in upper adapter 10 and ports 18 in drive shaft 12. Upper adapter 10 is provided with protruding retention shoulder 19.

In the embodiment shown in FIGS. 1-3 bimetallic member 20 is substantially cylindrical. Inner layer 22 has a higher thermal coefficient of expansion than outer layer 24. As shown in FIGS. 2 and 3, member 20 is provided with split 25 in substantially the axial direction. Inner layer 22 is provided with ledge 27 which engages retention shoulder 19 of upper adapter 10, thereby supporting the safety rod. The inner edge 28 of ledge 27 defines a circle that is eccentric with the circle defined by the circumference of member 20. Thus ledge 27 is widest at split 25 and narrowest at the point diammetrically opposed thereto. This is most easily seen in FIG. 3. Outer layer 24 is provided with collar 29 which rests on shelf 13 of drive shaft 12 to provide support for member 20.

Coolant flowing through ports 16 in upper adapter 10 comes in intimate contact with bimetallic member 20, so that the temperature of member 20 tends to be at or near the temperature of the flowing coolant. In the event of a thermal excursion in the nuclear reactor, the temperature of the coolant may rise about 200° F.; for example, a normal coolant outlet temperature of about 950°–1000° F. may rise to about 1150°–1200° F. The gain in temperature of the flowing coolant will be experienced by bimetallic member 20. Because the thermal coefficient of expansion of inner layer 22 is greater than that of outer layer 24, inner layer 22 will expand more than outer layer 24. This will cause bimetallic member 20 to deform by "opening" at split 25. The term "opening" as used here means that the two halves of bimetallic member 20 defined by split 25 are deflected from one another in a jaw-like manner such that split 25 widens. The extent of the opening will be much greater than that which would occur with simple mono-metallic thermal expansion. It may be seen that the greatest amount of deformation occurs at split 25 where ledge 27 is widest and almost no deformation occurs at the point diametrically opposed thereto where ledge 27 is narrowest. When the temperature is increased by at least a pre-determined amount, the deformation is sufficient such that the opening movement of bimetallic member 20 disengages ledge 27 from retention shoulder 19, thereby releasing the safety rod into the reactor core in automatic response to the thermal excursion.

Bimetallic member 20 is provided with spine 30 opposite split 25. Spine 30 is secured to drive shaft 12 by known fastening means such as screws 32. Spine 30 provides a pivot point for the jaw-like opening action of member 20.

After the reactor has cooled from its thermal excursion and bimetallic member 20 has resumed its normal configuration it may be easily reengaged with upper adapter 10. This is accomplished while the safety rod with upper adapter 10 is still in its lowered position. Drive shaft 12 supporting member 20 therein is forced downwardly over upper adapter 10. Upper conical portion 15 of upper adapter 10 forces bimetallic member 20 into a slightly open position. As drive shaft 12 moves downward, it brings bimetallic member 20 down along portion 11 of upper adapter 10, with ledge 27 following the contour of said portion until it is driven around and under retention shoulder 19. When member 20 reaches its normal position along upper adapter 10, the opening force is relieved and ledge 27 of member 20 simply snaps into place beneath retention shoulder 19. Thus the instant invention is uniquely simple to reengage.

An alternative embodiment of the invention is illustrated in FIGS. 4 and 5. In this embodiment, bimetallic means 120 comprises a plurality of bimetallic strips 121, each strip 121 having an inner layer 122 and an outer layer 124, each inner layer 122 having a larger thermal coefficient of expansion than the corresponding outer layer 124. In the particular embodiment shown, four such strips are provided. The strips 121 are parallel to upper adapter 110, and are suspended from drive shaft 112 by fastening means such as screws 132. The inner layer 122 of each strip 121 is provided with a supporting ledge 127 which engages upper adapter retention shoulder 119, so that the plurality of strips 121 together support upper adapter 110.

Coolant flowing upwardly past the safety rod (not shown), through interior 114 of upper adapter 110 and out of the ports 116 comes in intimate contact with bimetallic strips 121. In the event of a thermal excursion in the reactor, the temperature gain of the coolant will be experienced by bimetallic strips 121. The greater expansion of inner layers 122 relative to outer layers 124 causes bimetallic strips 121 to deform by deflecting away from upper adapter 110 near the region of engagement. At a predetermined increase in temperature, the deflection is sufficient such that support ledges 127 become disengaged from retention shoulder 119, thereby releasing the safety rod into the reactor core in automatic response to the thermal excursion. It may be seen that this embodiment of the invention can reengage the upper adapter in a manner analogous to that of the substantially cylindrical embodiment, that is, by pushing the drive shaft down over the upper adapter until ledges 127 snap into position under retention shoulder 119.

The instant invention is particularly well suited for use in liquid metal fast breeder reactors (LMFBR). In these reactors the normal coolant outlet temperature is about 950°–1000° F., so the pre-determined automatic release temperature for a thermal excursion should be about 1150°–1200° F. A typical rod assembly is about 18' long and about 6" across the flats of a hexagonal cross-section; the diameter of the upper adapter is typically somewhat narrower. For these dimensions, the overall size of the substantially cylindrical embodiment may be about 12" long and about 5.5" in diameter.

The inner layer may be an austenitic stainless steel which has a relatively high thermal coefficient of expansion, and the outer layer may be a high chrome steel having a lower thermal expansion coefficient. For these materials, satisfactory results will be obtained if each layer is about 0.050"–0.100" thick and if the device has a free length of about 4.0"–8.0".

The bimetallic components can be manufactured by known methods such as the explosive bonding process. It would be desirable for the non-stressed state of the bimetallic components to be about 1000° F.

The invention may be modified within the scope of the above teachings. For example, instead of using a retention shoulder and a supporting ledge, the upper adapter and the bimetallic components may be provided with corresponding ratchet grooves. The invention may also be adapted to different temperatures, may be enlarged or reduced in size, and may be made of different materials, all within the intended scope of the invention. The foregoing description is not intended to limit the invention to the precise forms disclosed. The embodiment was chosen and described in order to best explain the principles of the invention and its practical application.

The embodiments of this invention in which an exclusive property or privilege is claimed are defined as follows:

1. In a nuclear reactor having a core,
   a safety rod for downward insertion into and upward withdrawal from said core,
   a drive shaft for supporting and operating said safety rod,
   and drive means connected to said drive shaft for operating said shaft;
   apparatus for releasably supporting said safety rod,
   said apparatus comprising an upper adapter adapted to be affixed to the upper end of said safety rod,
   said upper adapter having a retention means,
   a lower portion on said drive shaft and having a hollow interior for housing said upper adapter,
   a bimetallic means supported within said hollow interior of said lower portion and having at least one ledge which engages said retention means to support said upper adapter,
   said bimetallic means being a substantially cylindrical bimetallic member for receiving said upper adapter in a generally coaxial relation,
   said substantially cylindrical bimetallic member comprising an inner layer and an outer layer,
   said inner layer having a greater coefficient of thermal expansion than said outer layer,
   said supporting ledge projecting inwardly on said inner layer for supporting said retention means,
   and said substantially cylindrical bimetallic member being provided with a split extending in a substantially axial direction,
   increasing temperature of said generally cylindrical bimetallic member being effective to cause said member to deform by opening at said split whereby said supporting ledge disengages from said retention means to release said upper adapter for downward movement with said safety rod into said core.

2. Apparatus according to claim 1,
   in which said hollow interior of said drive shaft is provided with a shoulder which supports said substantially cylindrical bimetallic member.

3. Apparatus according to claim 1,
   in which said substantially cylindrical bimetallic member has a mounting portion which is affixed to said lower portion of said drive shaft by fastening means.

4. Apparatus according to claim 1,
   in which said inner layer is made of an austenitic stainless steel,
   and said outer layer is made of a high chrome steel.

5. Apparatus according to claim 1,
   in which said retention means takes the form of a downwardly facing shoulder on said upper adapter for supporting engagement by said ledge.

6. Apparatus according to claim 1,
   in which said ledge tapers in width from said split toward a diametrically opposite portion of said substantially cylindrical bimetallic member.

* * * * *